INVENTORS.
LEONARD F. CRABTREE
PAUL A. COOPER
BY
Atty.

INVENTORS.
LEONARD F. CRABTREE
PAUL A. COOPER
BY
Atty.

FIG. 6

3,153,121
Patented Oct. 13, 1964

3,153,121
AIRPORT MULTI-LANGUAGE ANNOUNCING SYSTEM
Leonard F. Crabtree, Downers Grove, and Paul A. Cooper, Chicago, Ill., assignors to Automatic Electric Laboratories, Inc., Northlake, Ill., a corporation of Delaware
Filed Sept. 1, 1960, Ser. No. 53,404
25 Claims. (Cl. 179—6)

This invention relates to announcing systems, and more particularly, the invention relates to switching arrangements applicable for use with announcing systems of the type wherein a complete message is formed from the individual words and phrases that are separately pre-recorded, in each of a plurality of recording elements, whereby the complete message may be repeated in each of a plurality of foreign languages. This "synthesization" is a very efficient modus operandi because it allows a few dozen words and phrases to be combined into several thousand useful message combinations.

It is the usual practice in airline terminals, bus terminals and railway terminals for the operator or attendant on duty to announce the arrivals and departures of the various flights, busses or trains. Each operator inherently has a different speech characteristic, some of which make understanding difficult. It has been found that a larger percentage of passengers than necessary have missed their connections because they did not or could not understand the announcements.

It is desirable in, for example, an airline terminal where there may be a large number of flights which may have destinations in one or more foreign countries to be able to announce the departures of these flights in the language of those foreign countries, as well as in English. This requires the airline to employ a linguist having a knowledge of the language of these countries. The dial-access announcing system of this invention also employs the above mentioned synthesizing technique to repeat these announcemets in a plurality of different languages.

It is therefore the principle object of this invention to provide a novel and improved calling-device accessed switching arrangement which permits a plurality of individual stations to automatically select the individual recording elements containing the pre-recorded words or phrases to be combined to form a single message and which has provisions incorporated therein for repeating the message in one or more different languages.

In the embodiment of the invention disclosed herein a principle feature is the provision of a first chain of relays which switch the output leads connected to the recording elements from one set of recording elements containing segments pre-recorded in a first language to a second set of recording elements containing segments pre-recorded in a second language. Only the output leads connected to the recording elements containing the announcements which are to be transmitted in one or more of the different languages are connected through the contacts on one or more of the relays associated with the various languages while all of the other output leads connected to the recording elements are connected directly thereto. Thus, to announce a message in one or more of the different languages it is only necessary to connect the output leads connected to the recording elements through the contacts on the relay corresponding to the particular languages. Additional languages may be added to the system simply by providing an additional relay and the corresponding recording elements containing pre-recorded segments in that language.

In this connection it is a still further feature of this invention to provide a second chain of relays which determine whether or not a particular message is to be announced in one or more of the different languages, and which cause each of the relays in the first chain of relays to sequentially operate to switch the output leads connected to the recording elements from one group of recording elements to another. The second chain of relays is connected to the output leads of the decoder which extend to the recording elements. During the sequence of operation, if the particular message is to be announced in one or more of the different languages one or more of the relays in the second chain are sequentially operated, and after the completion of the announcement in a first language one of the relays in the first chain of relays is caused to operate to switch the output leads connected to the recording elements to the recording elements corresponding to the succeeding language.

A still further feature of this invention is the provision of a cancellation relay. Normally, if it is determined that a particular message is to be announced in a different language each of the relays in the first and the second chain of relays are sequentially operated to cause a message to be repeated in each of the different languages available. The cancellation relay is provided to terminate the announcement at any intermediate point in the sequence of repeating the message in the different languages. To terminate the announcements only requires a "jumper" cable to be connected from the output lead of the decoder corresponding to the message to be terminated to the cancellation relay, that is, for instance, if a message is to be announced in English and Spanish and terminated after the announcement in Spanish, a "jumper" cable is connected from the output lead of the decoder corresponding to the Spanish message, extending to the recording element containing the Spanish segment, to the cancellation relay. After the complete message is announced in Spanish the cancellation relay will terminate the announcements.

A further feature of the invention is the provision of an advance control relay which prevents the second chain of relays from advancing the message announcement to the next language in sequence during an emergency paging announcement.

A further feature of this invention is a provision of a decoder which is common to the system and which makes it possible to select one out of a large number of recording elements under control of a multi-number code digit dialled by an attendant. For example, in the disclosed embodiment the decoder is capable of translating a $3 \times 10$ number-combination to a one out of $10^3$ number-selection using only four rotary switches.

A further feature of the system is a provision of a unique marking and stopping circuit for the high-speed rotary switches in the decoder unit. The stopping circuit extends over a loop circuit which includes the wipers and bank contacts of the decoder switches, the switches in the message selectors and the scanner-selector switch and does not operate to stop the stepping of the wipers of the decoder switches till coincidence is obtained between the settings of all of the switches. The action is positive and results in errorless decoding since coincidence must be obtained, otherwise the wipers are continually stepped till the desired coincidence is found on all of the switches.

A further feature of the system is the provision of a holding circuit in the message selectors whereby the operator may dial the necessary information and then hang up the telephone handset. The message selector stores the information until it is serviced by the scanner controller; thus, in effect, it functions as a temporary memory for the system.

A still further feature of the system is the way in which the sequence of operation is controlled by means of a signal received from the individual recording elements. The operation is unique in that the information injected on dialling the first digit is not the first to be released, that is, is not the first to be transmitted. This information is stored temporarily until after a predetermined announcement has been made and then it is released to trigger the recording element containing the corresponding information. In addition, if it is a final call a further final call announcement is transmitted after the complete sequence of operation and before the equipment automatically releases. Provisions are also incorporated to automatically include an individual element, or "segment," of the announcement in the sequence of operation without the necessity of dialling. For instance, in the disclosed embodiment the particular element containing the gate number from where the call has originated is automatically selected by means identifying the call originating message selector. Furthermore, while one or more of the recording elements are selected under control of the decoder, one or more of the recording elements are selected under control of the messages selector directly.

It is a still further feature of the system to incorporate means whereby the system may still be used if there is a power failure. If a power failure does result the operator sets a selector switch to disconnect his telephone substation from the message selector and to connect it to a regular telephone line to a central office or a PABX installation, and then dials "0." By a suitable "jumpering" of the bank contacts of a ground-forwarding switch in the central office or PABX installation a ground is extended to operate the amplifier "turn on" relay to energize the amplifiers of the system; the attendant may then proceed with his announcement by means of the transmtter of the telephone handset.

The invention, both as to its organization and method of operation, together with other objects and features not specifically mentioned, will best be understood by reference to the following specification taken in connection with the accompanying drawings.

In these drawings:

FIGS. 1–6 when aligned as shown in FIG. 7 represents the invention as it is embodied in an airport paging system.

GENERAL DESCRIPTION

Referring now to the drawings. The dial-access switching arrangement as disclosed by this embodiment is incorporated into an airport announcing system. It is to be understood, however, that the invention is not limited to this environment and may be incorporated into any type of system employing this technique.

The system as disclosed comprises a series of telephone substations each of which may be connected by means of a switch to either a message selector associated with the telephone substation or to a regular telephone line. Only one such telephone substation 101 (FIGURE 1), switch 103 (FIGURE 1) and message selector 400 (FIGURES 3 and 4) is shown for clarity, however, it is to be understood that any number of telephone substations and associated message selectors may be used. The system further comprises a scanner-controller (FIGURES 2 and 3) including a sequence scanner switch 260 (FIGURE 2) and a scanner-selector switch 305 (FIGURE 3) which sequentially scans and locks in activated message selectors and converts the information stored therein into the proper series of switching operations that will successively energize the desired solenoids in the recording elements that contain the pre-recorded message segments to produce a complete message; a decoder (FIGURES 5 and 6) which is common to the system and which translates or decodes the dialled digits to select the desired recording elements containing the message segments; and a multi-language switching arrangement (FIGURE 1) comprising information group selector means for sequentially selecting one or more of the available foreign languages, information group sequence advance means for controlling the advancing of the information group selector means, information group cancellation means for cancelling the advance of the information group selector means, and advance control means for preventing the information group sequence advance means from advancing the information group selector during emergency announcements.

The audio output of the recording elements (not shown) is bridged by an end of message unit (not shown) which recognizes the end of each message segment and closes a contact to extend a ground pulse to the scanner-controller (FIGURES 2 and 3) causing it to advance to the next message segment. The tapes in the recording elements continue to play until the cue-up at the beginning of the message segments. This point on the tapes is identified by a photo-cell (one for each tape channel) which receives a pulse of light from a reflective foil marker placed on the tape. The photo-cell pulse properly amplified, releases thec orresponding solenoid to stop the recording element. The design of the end-of-message identifying arrangement does not form a part of the present arrangement, therefore the details of this technique have not been shown in the present disclosure.

To activate this system, the flight attendant sets selector switch 103 (FIGURE 1) to connect the telephone substation 101 to its associated message selector 400 (FIGURE 4), lifts the handset (not shown), dials a first digit to indicate whether the flight is "now arriving," "now boarding," or "now departing," and then the three digits of the flight number. On completion of dialling the message proceeds automatically. The flight attendant may hang up the handset if he so desires and the operation is not interrupted. The fact that he is dialling from a particular telephone substation, and has his own message selector, allows the gate identifying portion of the message to be automatically inserted without further dialling. In addition, if the message is to be announced in another language in addition to being announced in English one of the relays in the information group sequence advance means will be operated upon completion of the first announcement in the English language. This relay in turn operates a corresponding one of the relays in the information group selector means to switch the output leads to the recording elements from the English recording elements to the recording elements having pre-recorded segments in another language. After each complete sequence of operation another one of the relays in the information group sequence advance means is operated to, in turn, cause a corresponding one of the relays in the information group selector means to operate to sequentially switch the output leads until the announcement has been made in each of the available foreign languages. Furthermore, if an announcement is to be made in one or more but not all of the various languages an information group cancellation relay is provided to terminate the announcement after the completion of any particular one of the foreign languages.

During any time interval when the announcing system is idle, i.e., during any time interval when no announcement is being made, any flight attendant making a general announcement sets selector switch 103 (FIGURE 1) to disconnect his telephone substation 101 from message selector 400 and to connect the telephone substation 101 to a regular telephone line 109 available for normal operation of the telephone, lifts the handset (not shown) and then dials "0." On completion of dialling the flight attendant listens to hear whether or not a high frequency tone (a beep) is present and if not he proceeds with his general announcement by speaking into the transmitter of the telephone handset as when making a regular telephone call. The high frequency tone is to indicate that the announcing system is in use.

On an emergency announcement the flight attendant depresses push-button 162 (FIGURE 1) which automatically terminates any announcement which may be in progress. He then transmits his emergency announcement by means of microphone 161. An advance control relay is also provided to prevent the information group sequence advance means from causing the information group selector means from advancing during an emergency paging announcement.

DETAIL DESCRIPTION

Departure Announcement

Figure 1:
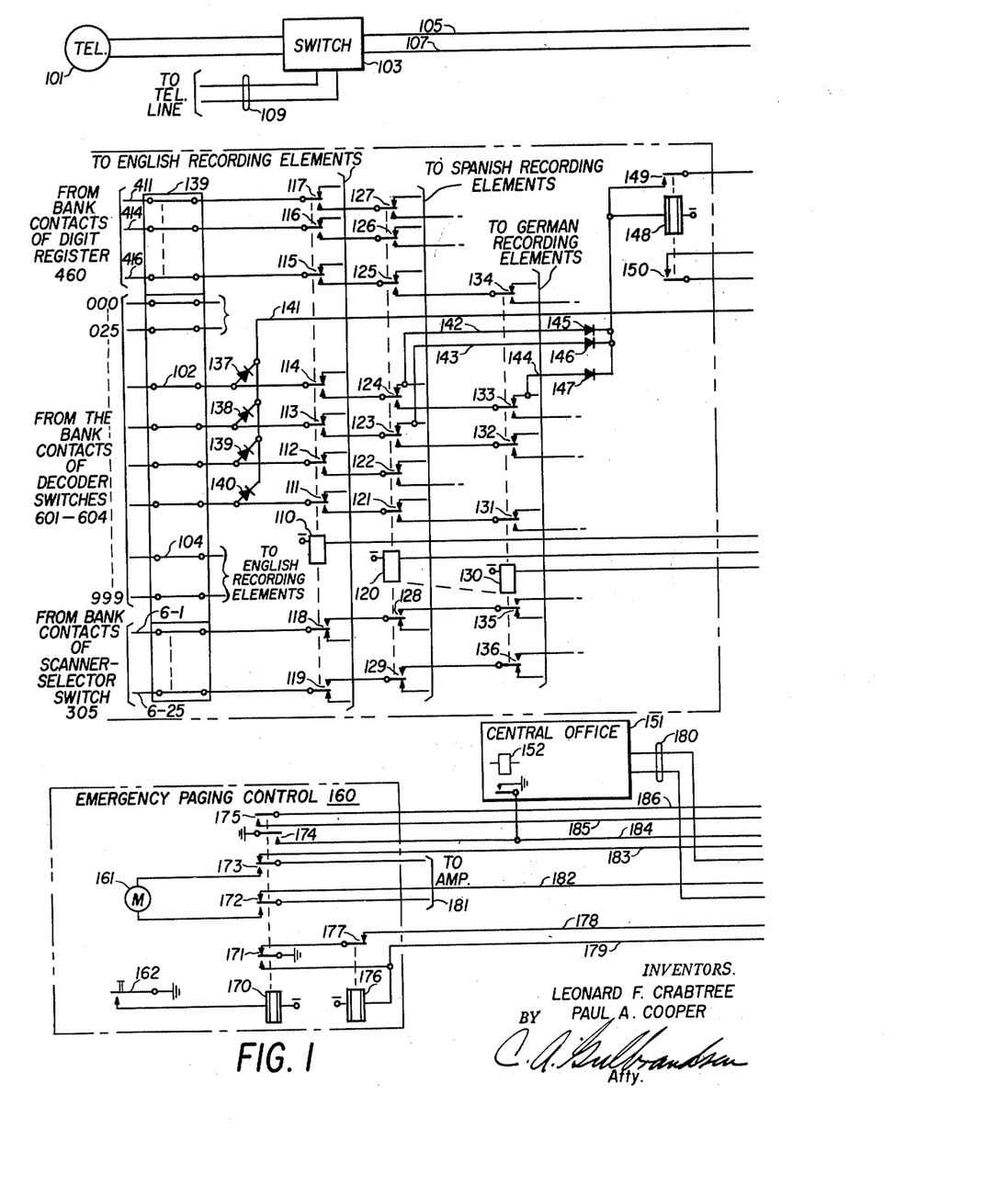
FIG. 1 shows the information group selector, the information group cancellation relay, the emergency paging control and the central office in block diagram.

Assume for the purpose of explaining the detailed operation of the system, that the operator at one of the gates desires to announce the departure of airline flight number 421, and that airline flight number has destinations in the United States and Spain. The operator sets switch 103 to gain access to message selector 400 (FIGS. 3 and 4) associated with telephone substation 101 (FIG. 1). On lifting the handset (not shown) a line loop is completed to operate pulsing relay 324; this may be traced as follows: battery, upper winding of relay 324, conductor 105 to the switch 103 and telephone 101 to conductor 107, break contact 328, lower winding of relay 324, make-before-break contact 335, to ground. Differential relay 321 is provided to release the message selector if the operator wishes to cancel the announcement after he has completed dialling (by removing the straps 323 on relay 321 and grounding the lower winding relay 321 is operated). Relay 324 on operating closes ground to operate slow-release relay 330 at make contact 325. Relay 330 on operating prepares a holding circuit for itself from battery of relay 330, make contact 332, make contact 336 on relay 334 (not yet operated), to ground. Also, at make contact 333 ground is extended through off-normal spring 402 of motor magnet 401 to operate relay 417 and an operate path is prepared for motor magnet 401 through make contact 331 of relay 330 and make contact 419 of relay 417 (now operated).

Figures 4, 7:
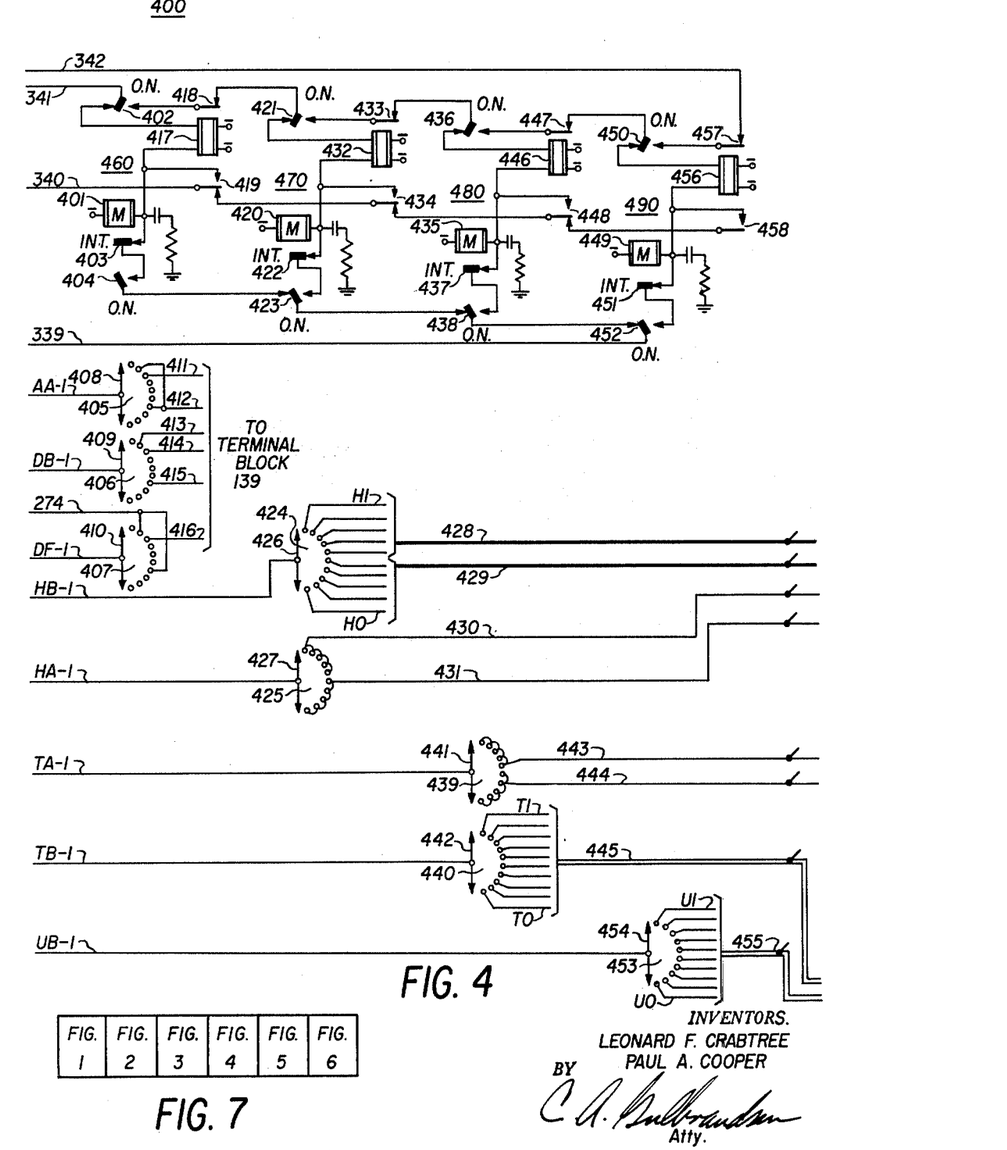
FIG. 4 shows part of the message selector.
FIG. 7 shows the alignment of FIGS. 1–6, inclusive.

The operator now dials the digit 3 for a "now departing" announcement. On dialling the digit 3, relay 324 is pulsed when the line loop is opened in the well-known manner by the dial impulse springs (not shown) to extend ground to motor magnet 401 over the above-mentioned path. Relay 330 being slow-to-release holds up during pulsing. Motor magnet 401 operates to step wipers 408, 409, and 410 to the third bank contact on their respective banks in the well-known manner. On the first step, off-normal springs 402 open to remove ground from slow-release relay 417 which is then held during pulsing by the ground extended through the lower winding. During the interdigital pause ground is removed from relay 417 and it releases. When relay 417 restores ground is extended through make contact 333 of relay 330, off-normal springs 402 of motor magnet 401, break contact 418 of relay 417, off-normal spring 421 of motor magnet 420, upper winding of relay 432 to battery to operate relay 432. Relay 432 on operating closes make contact 434 to prepare an operate path for motor magnet 420.

The operator now dials the flight number 421. On dialling the first digit 4, pulsing relay 324 is pulsed as before to extend ground to motor magnet 420 to cause it to step wipers 426 and 427 to the fourth bank contact on their respective levels, this may be traced as follows: ground, break contact 325 of relay 324, make contact 331 of relay 330, break contact 419 of relay 417, make contact 434 of relay 432, through motor magnet 420 to battery. Slow-release relay 330 again holds up during pulsing. Relay 432 is held through the lower winding, ground being removed from the upper winding as soon as motor magnet 420 steps off-normal at off-normal springs 421. During the interdigital pause relay 432 restores and extends ground to relay 446 which in turn prepares an operate path for motor magnet 435 in the manner described above for motor magnet 420. On dialling the next digit 2 the same operation is subsequently performed to operate motor magnet 435 to step wipers 441 and 442 to bank contact 2 on their respective banks and relay 446 on restoring extends ground through break contact 447 to operate relay 456.

Figure 3:
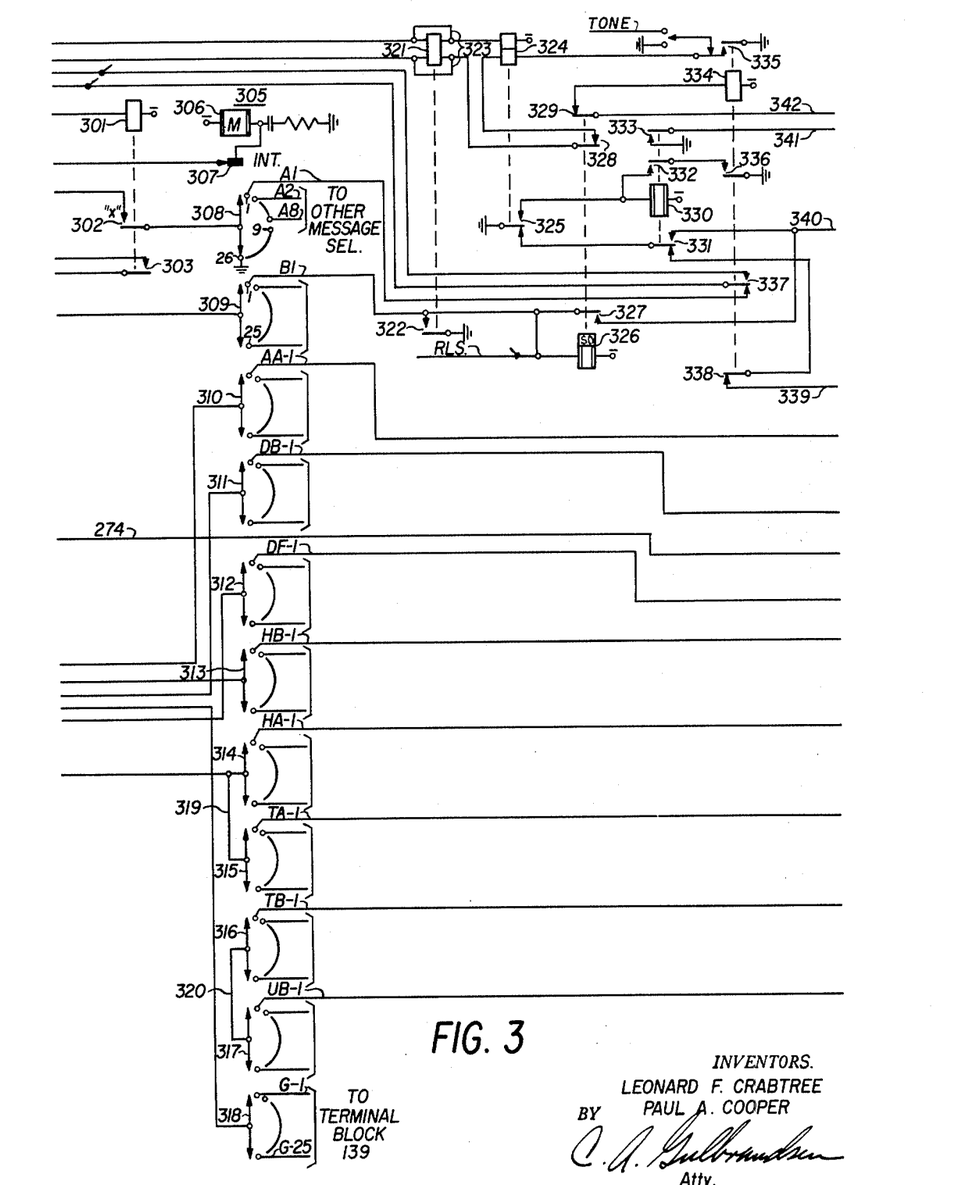
FIG. 3 shows part of the scanner-controller as well as part of the message selector.

On dialling the last digit 1, relay 324 is again pulsed and motor magnet 449 causes wiper 454 to step to its first bank contact as previously described. When the dialling is complete relay 334 is operated, this may be traced as follows: ground, make contact 333 of relay 330, off-normal springs 402, break contact 418, off-normal spring 421, break contact 433, off-normal springs 436, break contact 447, off-normal springs 450, break contact 457, conductor 342, break contact 329 to battery of relay 334. Relay 334 on operating extends a holding ground to relay 330 and relay 330 locks-up, this may be traced as follows: ground, make-contact 336 of relay 334, make contact 332 of relay 330, to battery. Also, at make-before-break contact 335 of relay 334 the ground connection holding up relay 324 is transferred.

It may be noted that when relay 334 is operated all of the switches in the message selector 400 are held up since relay 330 is locked-up. The operator may now hang up the telephone and attend to his additional tasks which he must perform and the subsequent announcement will proceed automatically; thus this special hold-up feature provides a temporary memory for the system storing the information to be announced until the message selector 400 associated with telephone substation 101 is serviced.

Before proceeding further with the announcement, the operation of the scanner-controller circuit (FIGS. 2 and 3) will be briefly described.

It may be observed when the message selector 400 associated with telephone substation 101 (the same is true for all of the other message selector units associated with the other telephone substations at each of the other gates) is idle, that is, no message is being stored, ground is extended to the first bank contact of scanner-selector switch 305 to mark this contact or message selector 400 as idle, this may be traced as follows: ground, break contact 254 of relay 253, conductor 281, break contact 337, conductor A1, to bank contact 1 of the scanner-selector switch 305. Scanner-selector switch 305 is of the non-homing type and wiper 308 remains on the bank contact associated with the last message selector which it served. It may be observed that the ground on the bank contacts is not extended to motor magnet 306 of the scanner-selector switch 305 to cause it to step until the "X" contact 302 of relay 301 is closed; thus motor magnet 306 is not continually stepping in search of a particular message selector requesting service.

Figure 2:
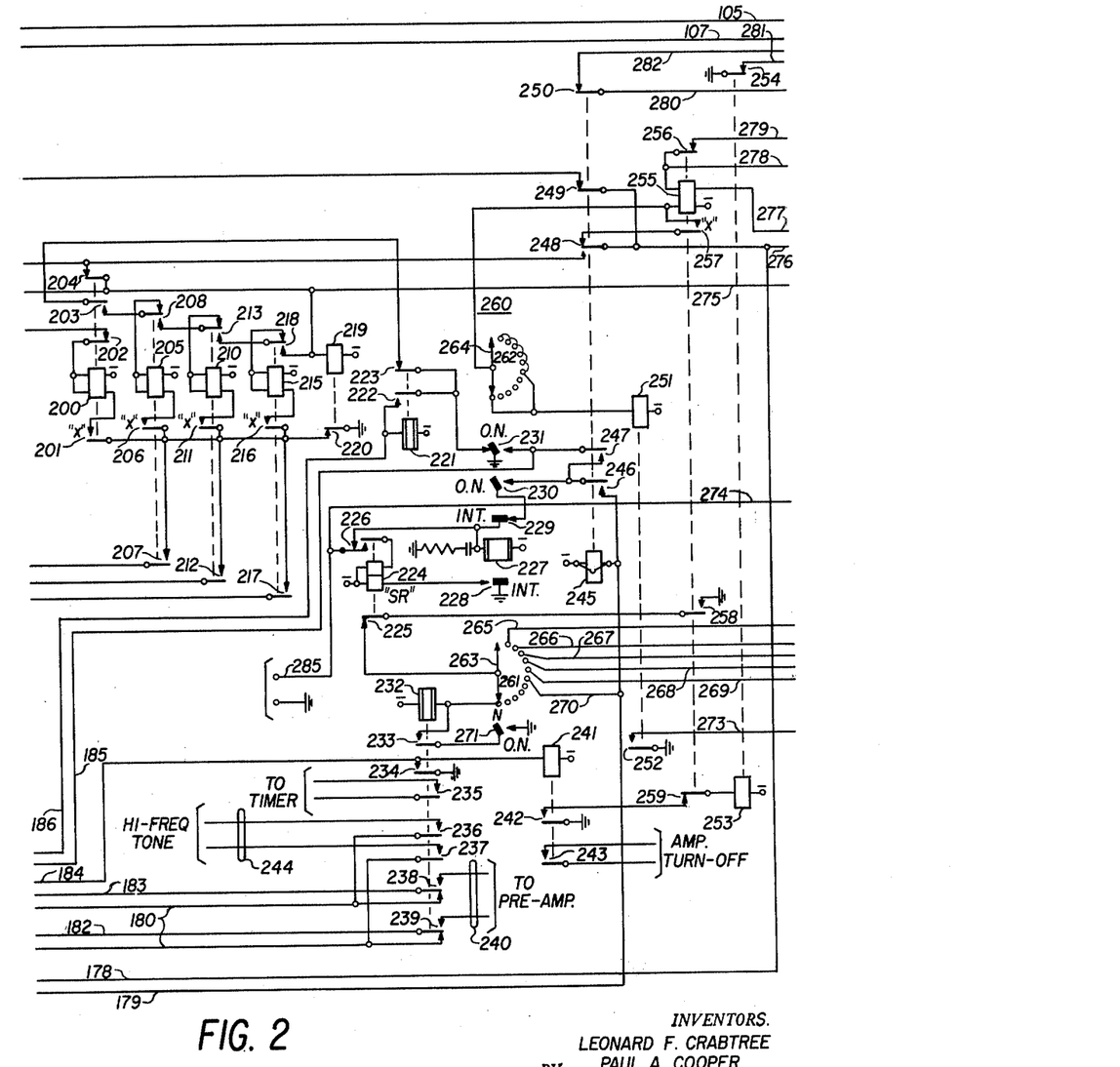
FIG. 2 shows part of the scanner-controller and the information group advance means.

Conductor 281 is multiplied to all of the available message selectors and if any one, or all, of the message selectors is requesting service relay 301 will be operated. This may be shown as follows: when a message selector is storing information relay 334, for example, is operated, at break-make contacts 337 of relay 334 ground is transferred from conductor A1 to conductor 282 (also multiplied), through break contact 250 of relay 245, to battery to operate relay 301.

Assume now that all of the message selectors are idle, that wiper 308 of scanner-selector switch 305 is sitting on its tenth contact, and that the flight attendant at telephone substation 101 has just completed dialing the above-mentioned information, and that relay 334 has operated. When relay 334 operates ground is transferred to conductor 282 by way of break-make contacts 337 of relay 334, over conductor 282, break contact 250 of relay 245 to battery of relay 301. Relay 301 operates to close "X" contact 302. Since all of the other message selectors were assumed idle wiper 308 of scanner-selector switch 305 will find ground to operate motor magnet 306 causing it to step to the next contact. If it finds another ground on this contact it will step again and continue to step until finding the contact requesting service. This may be traced as follows: ground on any bank contact associated with an idle message selector, "X" contact 302 of relay 301 (now operated), break contact 256 of relay 255, interrupted contact 307 of motor magnet 306, to battery of motor magnet 306.

Relay 301 after closing its "X" contact 302 operates fully to close make contact 303 which in turn causes relay 255 to operate its "X" contact 257, and on the closing of "X" contact 257 to operate fully; this may be traced as follows: battery of motor magnet 306, interrupter contact 307, break contact 256, upper winding of relay 255, make contact 303, conductors 276 and 178, break contacts 177 and 171, to ground to cause "X" contact 257 to close. When "X" contact 257 closes relay 255 operates fully and locks-up over the following path: battery of relay 255, "X" contact 257 of relay 255, break contact 248, conductors 276 and 178, break contacts 177 and 171, to ground.

It may be observed that when relay 301 operated fully the lower winding of relay 255 and the motor magnet 306 were in series. Motor magnet 306 did not or will not step again, however, because of the high resistance of the lower winding of relay 255. It may also be noted that relay 255 would be shunted out and would not operate its "X" contact 257 if wiper 308 of scanner-selector switch 305 had found ground on stepping to the next contact, this may be traced from the bank contact associated with an idle message selector to ground as previously described. Motor magnet 306 would have then stepped to the next following contact.

When "X" contact 257 of relay 255 operates ground is also extended to relay 251 causing it to operate, this is as follows: ground, break contacts 171 and 177, conductors 178 and 276, break contact 248, "X" contact 257 of relay 255, wiper 264 and the homing bank contact of sequence scanner switch 260, to battery of relay 251.

Relay 255 in operating fully extends ground through make contact 258, break contact 225, to the wiper 263 of the sequence scanner switch 260. It may be observed that the sequence scanner switch 260 is of the homing type and wiper 263 homes on the last, or homing, bank contact. When ground is extended to wiper 263 of sequence scanner switch 260 relay 232 operates to close contacts 233–239; the subsequent result of closing these contracts initiates the operation of the announcing system as follows: at make contact 233 a lock-up path is prepared for relay 232 through off-normal springs 271 to ground; at make contact 234 ground is extended to operate relay 241, the operation of which will be explained later; at make contact 235 a loop circuit is completed to energize the timer circuit (not shown) of the recording elements, the timer circuit when energized introduces a 20 second delay which is sufficient for the decoding operation to be completely performed as well as any other operation which must be performed prior to the initial announcement; at make contacts 236 and 237 a high frequency tone is extended by way of conductors 244, the purpose of this tone will be explained later; at make contacts 238 and 239 a loop circuit is completed from the output of the pre-amplifiers (not shown) of the recording elements by way of the pair of conductors 240 and conductors 182 and 183, break contacts 172 and 173 to the input of the main amplifiers (not shown) by way of conductors 181, the output of the recording elements being pre-amplified and then again amplified before being impressed on the system's loudspeakers (not shown).

Referring now to relay 241 which operated when make contact 234 of relay 232 closed. Relay 241 on operating closes make contact 242 to extend a ground which has no effect at this time since relay 255 is operated to open break contact 259, and at make contact 243 a loop circuit is completed to energize the main amplifiers previously mentioned.

Relay 251 in operating initiates the decoding operation which is preferably performed at this time (during the 20 second delay introduced by the timer) to eliminate any unnecessary delay during the announcement, that is, during the intervals between the various segments of the message.

Figure 5:
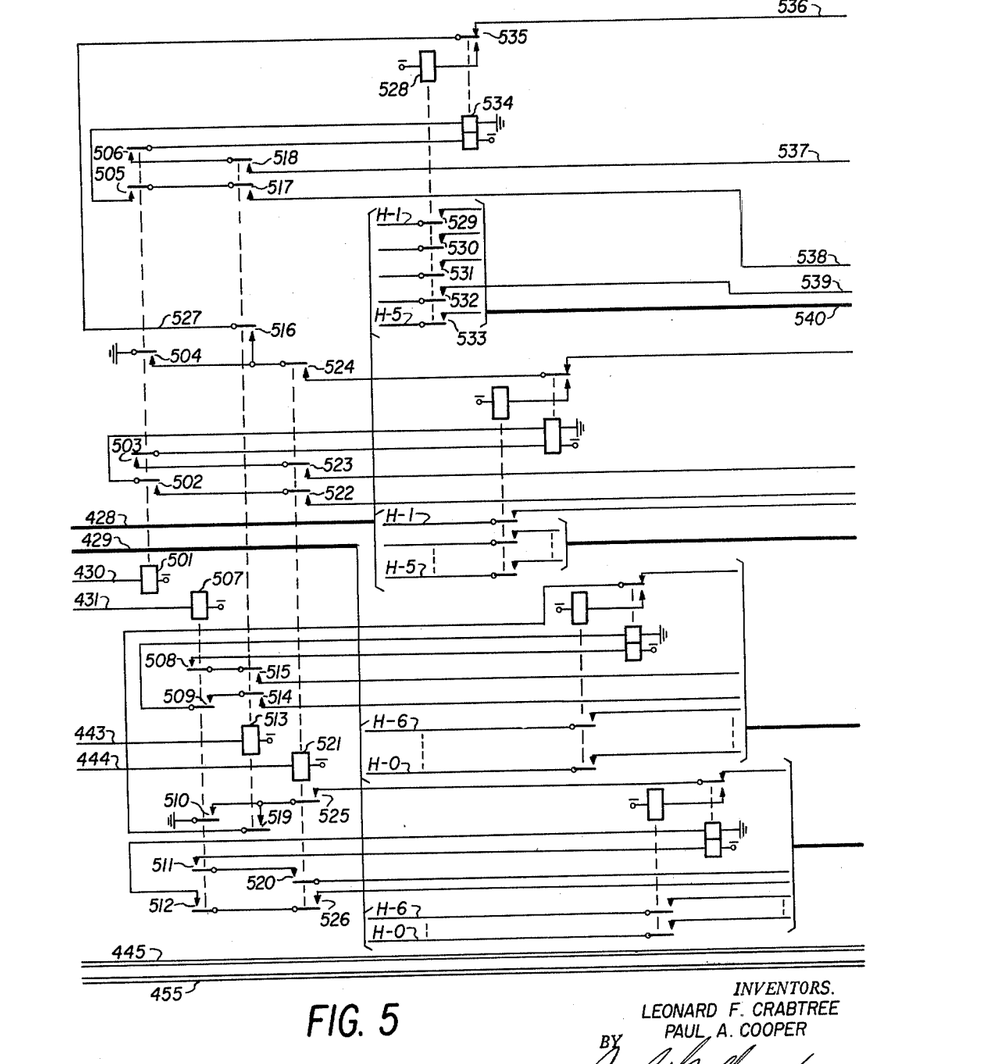
FIGS. 5 and 6 show the decoder.
Figure 6:
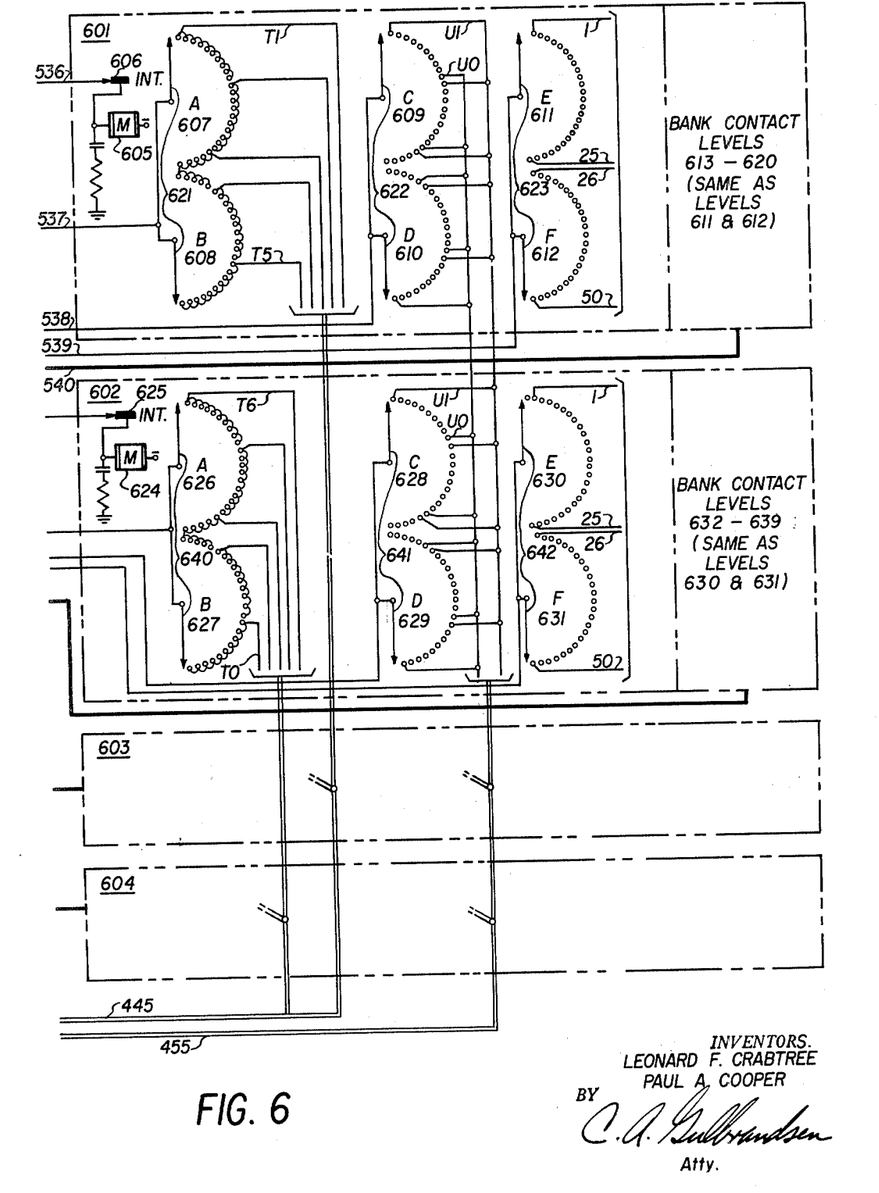

The common decoder (FIGS. 5 and 6) comprises only 4 rotary switches 601–604 which may be the type disclosed by Graybill et al. in U.S. Patent 2,522,715, issued September 19, 1950, and decoding of the 3-digit flight number to select one output connection out of 1000 possible output connections to the recording elements is accomplished, in part, by means of the bank contacts on digit registers 470 and 480. It may be noted that the bank contacts on the second level (as shown) of digit register 470 and the bank contacts on the first level (as shown) of digit register 480 are multiplied to form two groups of bank contacts comprising bank contacts 1–5 and bank contacts 6–10, respectively. Relays 501, 507, 513 and 521 are connected individually to one of these groups and, when operated, served to select one of the decoder switches 601–604. Selection of one of the decoder switches 601–604 is made by operating two of the relays, as shown in the table which follows:

| Relays: | Decoder switch |
|---|---|
| 501 and 513 | 601 |
| 501 and 521 | 602 |
| 507 and 513 | 603 |
| 507 and 521 | 604 |

Decoder switches 601–604 each have 14 levels of bank contacts with 25 bank contacts on each level; only 6 levels (levels 607–612) of the bank contacts of decoder switch 601 and 6 levels (levels 626–631) of decoder switch 602, respectively, are shown for clarity and are sufficient to explain the operation of the decoder. Decoder switches 603 and 604 are shown in block form and are the same as decoder switches 601 and 602, that is, the bank contacts of decoder switch 603 are tied similarly to the bank contacts of decoder switch 601 and the bank contacts of decoder switch 604 are tied similarly to the bank contacts of decoder switch 602. The bank contacts on levels 611 and 612, as well as all of the bank contacts on the levels not shown, on all of the decoder switches are individually designated from 000–999 and are individually connected to a pre-determined one of the recording elements, by way of terminal board 139 (FIG. 1).

It may be observed that the bank contacts on levels 607, 608, 626 and 627 of decoder switches 601 and 602 (as well as the bank contacts on the same levels of decoder switches 603 and 604) are tied in 10 groups of 10 bank contacts per group with each group tied to one of the conductors T1–T0, respectively. The bank contacts on levels 609, 610, 628 and 629 of decoder switches 601 and 602 (as well as decoder switches 603 and 604) are sequentially connected, individually, to one of the conductors U1–U0. This arrangement is such that when, for example, wiper pairs 621 and 622 are stepped, wiper pair 622 steps over 10 bank contacts while wiper pair 621 steps over 1 bank contact (actually 10 bank contacts multipled to form 1 bank contact).

Referring now to the description of the announcement, the decoding operation takes place as follows: wipers 427 and 441 of digit register 470 and 480, respectively, were stepped to select relays 501 and 513. Relay 251 in operating closes make contact 252 to extend a ground to operate relays 501 and 513; this may be traced as follows: ground, make contact 252, conductor 273, wipers 314 and 315 of the scanner selector switch 305, bank contact 1 on their respective levels, conductors HA-1 and TA-1, wipers 427 and 441 of digit registers 470 and 480, bank contact 4 of digit register 470, and bank contact 2 of digit register 480, to conductors 430 and 443, respectively, to battery of relays 501 and 513 causing them to operate.

Relays 501 and 513 in operating close make contacts 504 and 516 to extend ground to energize motor magnet 605, this may be traced as follows: ground, make contacts 504 and 516, conductor 527, break contact 535 of relay 534, interrupter contact 606, to battery of motor magnet 605. Motor magnet 605 operates to step the wipers of decoder switch 601 and interrupts itself each time it steps, at interrupter contact 606. Relays 501 and 513 in operating also close make contacts 505, 506, 517 and 518 to prepare a stopping circuit for the decoder switch 601, this may be traced as follows: battery on relay 534, make contacts 506 and 518, wiper pair 621 of decoder switch 601, bank contacts of either level 607 or 608 of decoder switch 601, conductor cable 445, bank contact 2 of digit register 480, wiper 442, conductor TB-1 to bank contact 1 of scanner-selector switch 305, wiper 316, jumper cable 320 to the wiper 317, bank contact 1 of scanner-selector switch 305, conductor UB-1, wiper 454 and the first bank contact of digit register 490, conductor cable 455 to the bank contacts of either level 609 or 610 of decoder switch 601, wiper pair 622 of decoder switch 601, conductor 538, make contacts 517 and 505, upper winding of relay 534 to ground; relay 534 will only operate when coincidence is obtained on all of the above switches, that is, wiper pairs 621 and 622 (as well as the rest of the wipers on the switch) continue to step until the above-described path is completed to operate relay 534 which in turn de-energizes motor magnet 605 by opening break contact 535 to remove ground.

At the end of the 20 second delay introduced by the timer, the timer extends a false ground on conductor 285, through make-before-break contact 226, to battery to cause the motor magnet 227 of sequence scanner switch 260 to step wiper 263 to the first bank contact.

When wiper 263 of sequence scanner switch 260 steps to the first bank contact ground is extended to energize a solenoid of the English recording element containing the initial segment of the message announcement causing it to operate and start the announcement. This may be traced as follows: ground, make contact 258 of relay 255, break contact 225 of relay 224, wiper 263 and the first bank contact of sequence scanner switch 260, conductor 265, wiper 310 and the first bank contact of scanner-selector switch 305, conductor AA-1, wiper 408 and the third bank contact of digit register 460, conductor 411 to terminal block 139, break contact 117 to the solenoid of the English recording element containing the initial segment. The output of the recording element is impressed on the preamplifier, over conductors 240, make contacts 238 and 239, over conductors 182 and 183, break contacts 172 and 173, to the main amplifiers, and then transmitted by means of the systems loudspeaker. At the end of the message segment a sub-audible tone which is super-imposed on the audio portion of the message segment ceases and an end of message unit (not shown) detects the absence of this tone and causes a ground pulse to appear on conductor 285. The recording element continues to run until a photo-cell detects a light beam reflected from a reflective foil marker placed at the beginning of the message segment. The signal output of the photo-cell, properly amplified, causes the solenoid, which was previously energized to start the recording element, to drop out and stop the running of it.

The ground pulse from the end of message unit is extended by way of conductor 285, make-before-break contacts 226, to battery of motor magnet 227 to cause it to operate and step wiper 263 of sequence scanner switch 260 to the second bank contact. When motor magnet 227 operates interrupter contact 228 closes to extend ground to slow release relay 224 causing it to operate. Relay 224 in operating interrupts motor magnet 227 by removing the ground on conductor 285 at make-before-break contacts 226.

Wiper 263 of sequence scanner switch 260 in stepping to the second bank contact extends a ground to operate the solenoid of the English recording element containing the flight number stored by digit registers 470, 480 and 490 of message selector 400. This may be traced as follows: ground, make contact 258 of relay 255, break contact 225 of relay 224, wiper 263 and the second bank contact of sequence scanner switch 260, conductor 266, wiper 313 and the first bank contact of scanner selector switch 305, conductor HB-1, wiper 426 and the fourth bank contact of digit register 470, conductor cable 428, make contact 532 of relay 528, conductor 539, to wiper pair 623 of decoder switch 601 and from the bank contacts on level 611 or 612 of decoder switch 601, to terminal block 139, and, for purpose of illustration only, assume that conductor 102 is a conductor associated with the output of the decoder corresponding to flight number 421 to the solenoid of the English recording element container flight number 421 previously dialled by the operator.

It may be observed that the level to which the desired recording element is connected is selected after the initial selection of the decoder switch, that is, initially, one of the decoder switches is selected and then the particular level of that switch to which the desired recording element is connected is selected. It may also be noted that relay 528 operated when relay 534 operated, this may be traced as follows: ground, make contact 504 of relay 501, make contact 516 of relay 513, conductor 527, make contact of the break-make contacts 535 of relay 534 to battery of relay 528. Relay 528 in operating also opened the path whereby ground was extended to operate motor magnet 605 of decoder switch 601 at break-make contacts 535 of relay 534.

It may be noted at this time that all of the output leads on the bank contacts of digit register 460 and all of the output leads from the bank contacts on the last level (as shown) of scanner-selector switch 305 corresponding to the gate numbers are connected to the terminal block 139 and through the contacts of relay 110, 120 and 130 to the recording elements containing the different foreign languages. If any one of the many flight numbers is to be transmitted in more than one language these output leads may be permanently connected in this manner since one or more of these output leads connected to the recording elements are common to each of the announcements and must be switched each time that it is determined that any of the announcements are to be made in more than one language. Normally however, it will not be necessary to announce all of the various flight numbers in any language other than, for example, the English language. Under these circumstances, therefore, it is only necessary to switch the output leads, for example, the output lead 102, which are to be transmitted in more than one language. These output leads are the only output leads connected through the bank contacts of relays 110, 120 and 130 to the recording elements containing the different languages. All of the other output leads, for example output lead 104, are connected directly to the recording elements containing, for example, the English language. Switching only the output leads associated with the flight numbers to be announced in more than one language results in a considerable savings of bank contacts and makes the arrangement very practical.

It may also be noted that since flight number 421 is to be announced in Spanish as well as in English that the ground extended through the decoder bank contacts to energize the solenoid of the English recording element containing the flight number is also extended through diode 137, over conductor 141, break contact 202 of relay 200, through the upper winding of relay 200, to battery to cause relay 200 to operate its "X" contacts 201. Relay 200 in operating its "X" contacts 201 has ground extended through the lower winding but will not operate fully at this time since ground is present on both sides of the winding, and will not operate fully until ground is removed from conductor 141. Diodes 137—140, as well as diodes 145–147, prevent any stray ground paths which may energize a solenoid of any of the other recording elements, or any other of the relays.

Again as previously described, the ground pulse from the end of message unit is extended on conductor 285 to cause motor magnet 227 of the sequence scanner switch 260 to operate and step wiper 263 to the third bank contact. When wiper 263 steps to the third bank contact ground is again extended to energize the solenoid of the English recording element containing the next segment, that is, the "now departing" segment of the announcement. This may be traced as follows: ground, make contact 258 of relay 255, break contact 225 of relay 224, wiper 263 and the third bank contact of sequence scanner switch 260, conductor 267, wiper 311 and the first bank contact of scanner-selector switch 305, conductor DB–1, wiper 409 and the third bank contact of digit register 460, and by way of conductor 414 to the terminal block 139, break contact 116 of relay 110, to the solenoid of the English recording element, causing it to operate and start the announcement. At the end of the announcement motor magnet 227 of sequence scanner switch 260 is again caused to operate by the ground pulse on conductor 285 from the end of message unit, and wiper 263 of sequence scanner switch 260 is stepped to the fourth bank contact.

The gate number, which was not dialled, associated with the telephone substation 101 and message selector 400 is now automatically included in the message announcement. This may be traced as follows: ground, make contact 258 of relay 255, break contact 225 of relay 224, wiper 263 and the fourth bank contact of sequence scanner switch 260, conductor 268, wiper 318 and the first bank contact of scanner-selector switch 305, conductor G–1, to the terminal block 139, break contact 118 of relay 110, to the solenoid of the English recording element containing the gate number segment of the message. After transmitting the gate number motor magnet 227 of sequence scanner switch 260 is again operated in the manner previously described by the ground pulse from the end of message unit causing wiper 263 of sequence scanner switch 260 to step to the fifth bank contact. It may now be noted that a further feature incorporated in this announcing system is that on a "now departing" announcement that the sequence of operation is such that after the gate number has been announced a "final departure" announcement is automatically transmitted. This is as follows: when wiper 263 of sequence scanner switch 260 steps to the fifth bank contact ground is extended to operate the solenoid associated with the English recording element containing a "final departure" announcement by way of conductor 416; this may be traced as follows: ground, make contact 258 of relay 255, break contact 225 of relay 224, wiper 263 and the fifth bank contact of sequence scanner switch 260, conductor 269, wiper 312 and the first bank contact of scanner-selector switch 305, conductor DF–1, wiper 410 and the third bank contact of digit register 460, conductor 416, to terminal block 139, break contact 115 of relay 110, to the solenoid of the English recording element, causing it to operate. At the end of this segment motor magnet 227 of sequence scanner switch 260 is again caused to step wiper 263 of sequence scanner switch 260 to the sixth bank contact in the manner previously described.

When wiper 263 of sequence scanner switch 260 steps to the sixth bank contact relay 245 is operated to cause the motor magnet 227 of sequence scanner switch 260 to step to its homing position, that is, to its last, or homing bank contact; this may be traced as follows: ground, make contact 258 of relay 255, break contact 225 of relay 224, wiper 263 and the sixth bank contact of sequence scanner switch 260, conductor 270, to the battery of relay 245. Relay 245 in operating extends ground through off-normal springs 231, make contact 247, off-normal springs 230 and interrupter contact 229 to the motor magnet 227, causing it to operate. It may also be noted that relay 245 in operating is locked up by means of the ground extended through off-normal springs 231 of motor magnet 227, make contact 247 and 246 of relay 245, to battery of relay 245. Motor magnet 227 continues to operate and interrupt itself through interrupter contact 229 until reaching the last or its homing bank contact at which time its off-normal contacts 231 and 230 open to restore relay 245. It may be observed that the system as disclosed uses only the first five bank contacts of the sequence scanner switch 260 thus provisions are provided for expanding the operation of the system simply by using the remaining bank contacts on the sequence scanner switch 260.

Furthermore, it may be noted that relay 245 in operating causes relays 255 and relay 251 to restore since the break contact of break-make contacts 248 of relay 245 is opened removing the holding ground for relays 255 and 251. Normally, ground is extended through the make contact of the break-make contacts 248 of relay 245, break contact 204 of relay 200, conductor 275, wiper 309 and the first bank contact of scanner-selector switch 305, conductor B–1, to battery of relay 326 causing it to operate and thereby release the message selector 400. However, relay 200 on operating fully opened the path at break contact 204 whereby this ground was normally extended to operate relay 326. Digit registers 460, 470, 480 and 490, therefore, remain locked up and do not release the information stored therein.

When wiper 263 of the sequence scanner switch 260 is stepped to its homing contact, off-normal springs 231 open to remove the holding ground on relay 245 causing it to restore. In addition, when wiper 263 is stepped to its homing contact the ground connected to the off-normal contact 231 is extended through break contact 223 of relay 221, make contact 203 of relay 200, break contact 208 of relay 205, to battery of relay 205 causing it to operate its "X" contact 206. Relay 205, as with relay 200, does not operate fully at this time since ground is connected on both sides of the lower winding of relay 205, and relay 205 will not operate fully until ground is removed at off-normal springs 231.

Relay 245 in restoring causes relay 301 to again operate since relay 334 of message selector 400 is still operated and ground is extended through break contact 254 of relay 253, over conductor 281, make contact 337 of relay 334, conductor 282, break contact 250 of relay 245 (now restored), to battery of relay 301 causing it to operate its "X" contact 302. Wiper 308 of scanner-selector switch 305, since scanner-selector 305 is of the non-homing type, is still connected to bank contact 1 associated with message selector 400. When relay 301 operates closing its "X" contact 302 motor magnet 306 finds no ground to cause it to operate to step wiper 308 to the next bank contact. Relay 301 now operates fully closing make contact 303 to extend ground through its upper winding to the battery of motor magnet 306 in the manner previously described causing it to close its "X" contact 257 and to again lock up. Relay 255 in operating also extends ground through its "X" contact 257, wiper 264 of sequence scanner switch 260 and its homing bank contact, to battery of relay 251 causing it to operate.

Relay 255 in operating closes make contact 258 to extend ground through break contact 255 of relay 224 to the wiper 263 of sequence scanner switch 260 and its homing bank contact to battery of relay 232 causing it to operate to again initiate the operation of the system in the manner previously described. Also, relay 251 in operating closes make contact 252 to extend ground over conductor 273 to operate relay 501 and 513 in the manner previously described to commence the decoding by the decoder switch 601.

After the 20 second delay introduced by the timer the false ground is again extended over conductor 285, make-before-break contact 226, to battery of motor magnet 227 to cause it to operate and step wiper 263 to the first bank contact of sequence scanner switch 260. Also, at interrupter contact 228 ground is extended through the lower winding of slow release relay 224 to battery to cause relay 224 to operate and open break contact 225 to remove ground from wiper 263. Motor magnet 227 in stepping the wiper 263 to the first bank contact of sequence scanner switch 260 at off-normal springs 231 removes the ground on one side of the lower winding of relay 205. On removing ground relay 205 locks up on the ground extended through break contact 220 of relay 219, "X" contact 206 of relay 205, the lower winding of relay 205, the upper winding of relay 205, to battery to cause relay 205 to operate fully. Relay 205 in operating fully prepares an operate path for relay 210 at make contact 208 and at make contact 207 extends ground through break contact 220 of relay 219, make contact 207 of relay 205 to battery of relay 110 causing it to operate. Relay 110 in operating switches its contacts 111–119 to disconnect the output leads from the English recording elements and connects them to the Spanish recording elements. Relay 224 is made a slow-to-release relay to assure that ground is removed from wiper 263 of sequence scanner switch 260 during the switching operation performed by relay 110. If ground was not removed from wiper 263 as it stepped on to the first bank contact of sequence scanner switch 260 the ground would be extended over conductor 265 to energize the solenoid of the English recording element containing the initial segment of the message.

When slow release relay 224 restores closing break contact 225 ground is extended through make contact 258 of relay 255, break contact 225 of slow release relay 224, wiper 263 and the first bank contact of sequence scanner switch 260, conductor 265, wiper 310 and the first bank contact of scanner-selector switch 305, over conductor AA–1, wiper 408 and the third bank contact of digit register 460, over conductor 411, to the terminal block 139 make contact 117 of relay 110, break contact 127 of relay 120, to the solenoid of the Spanish recording element containing the initial segment of the message, causing it to operate. At the end of the Spanish transmission the ground pulse from the end of message unit is again extended on conductor 285, through make-before-break contact 226, to battery of motor magnet 227 causing it to operate and step wiper 263 of the sequence scanner switch 260 to the second bank contact. When wiper 263 steps to the second bank contact ground is extended to operate the solenoid of the Spanish recording element containing the flight number, this may be traced as follows: ground, make contact 258 of relay 255, break contact 225 of relay 224, wiper 263 and the second bank contact of sequence scanner switch 260, over conductor 266, wiper 313 and the first bank contact of scanner-selector switch 305, over conductor HB–1, wiper 426 and the fourth bank contact of digit register 470, over conductor cable 428, make contact 532 of relay 528, conductor 539, to the wiper pair 623 of decoder switch 601, and from the bank contacts on level 611 or 612 of decoder switch 601, to the terminal block 139, and again, for the purpose of illustration only, assume that conductor 102 is the conductor associated with the output of the decoder corresponding to flight number 421, through make contact 114 of relay 110, break contact 124 of relay 120, to the Spanish recording element containing the flight number 421.

It may be recalled that airline flight number 421 had destinations in the United States and Spain. Since airline flight number 421 does not have an ultimate destination in Germany it is desirable to eliminate the announcement of the message in German. This is accomplished in the following manner: the jumper cable 142 and a diode 145 are connected from the output side of the break contact 124 of relay 120 extending to the Spanish recording elements to jumper the ground pulse to relay 148 which is a slow release relay. Thus, when the ground is extended over conductor 102, make contact 114 of relay 110, break contact 124 of relay 120 to the solenoid of the Spanish recording elements it is also extended by way of jumper cable 142, diode 145, to battery of relay 148 causing it to operate. Relay 148 at make contact 149 locks up to ground extended through break contact 171 of relay 170, break contact 177 of relay 176, conductor 178, conductor 276, break contact 249 of relay 245, make contact 149 of relay 148 to battery of relay 148. Relay 148 at make contact 150 also prepares a release path for the message selector 400.

When the flight number has been announced in Spanish the ground pulse is again extended from the end of message unit, over conductor 285, make-before-break contact 226, to battery of motor magnet 227, causing it to operate and step wiper 263 of sequence scanner switch 261 to its third bank contact. At interrupter contact 228 of motor magnet 227 ground is again extended to operate slow-to-release relay 224. When slow release relay 224 restores ground is again extended to energize the solenoid associated with the Spanish recording element containing the next segment, that is, the "now departing" segment of the announcement. This may be traced as follows: ground, make contact 258 of relay 255, break contact 225 of slow release relay 224, wiper 263 and the third bank contact of sequence scanner switch 260, conductor 267, wiper 311 and the first bank contact of scanner selector switch 305, conductor DB–1, wiper 409 and the third bank contact of digit register 460, conductor 414, to the terminal block 139, make contact 116 of relay 110, break contact 126 of relay 120, to the solenoid of the Spanish recording element containing this segment of the announcement, causing it to operate. On completion of the "now departing" segment of the announcement in Spanish the ground pulse again is extended from the end of message unit, over conductor 285, make-before-break contacts 226 to battery of motor magnet 227 causing it to operate to step wiper 263 of sequence scanner switch 260 to the fourth bank contact. At interrupter contact 228 of motor magnet 227 ground is again extended to operate slow-to-release relay 224. When the slow release relay 224 restores ground is again extended to energize a solenoid of the Spanish recording element associated with the gate number. This may be traced as follows: ground, make contact 258 of relay 255, break contact 225 of slow release relay 224, wiper 263 and the fourth bank contact of sequence scanner switch 260, conductor 268, wiper 318 and the first bank contact of scanner-selector switch 305, conductor G–1, to the terminal block 139, make contact 118 of relay 110, break contact 128 of relay 120, to the solenoid of the Spanish recording element containing the gate number, causing it to operate. On completion of the announcement in Spanish the ground pulse is again extended from the end of message unit, over conductor 285, make-before-break contact 226, to battery of motor magnet 227, causing it to operate and step wiper 263 of sequence scanner switch 260 to the fifth bank contact. Also, at interrupter contact 228 of motor magnet 227 ground is again extended to operate slow release relay 224. At this point in the sequence as wiper 263 of sequence scanner switch 261 steps to the fifth bank contact the "final departure" announcement is automatically inserted in the sequence of operation. This may be traced as follows: ground, make contact 258 of relay 255, break contact 225 of slow-to-release relay 224, wiper 263 and the fifth bank contact of sequence scanner switch 261, conductor 269, wiper 312 and the first bank contact of scanner-selector switch 305, conductor DF-1, wiper 410 and the third bank contact of digit register 460, conductor 416, to the terminal block 139, make contact 115 of relay 110, break contact 125 of relay 120, to the solenoid of the Spanish recording element containing the "final departure" segment of the announcement, causing it to operate.

On completion of the "final departure" announcement in Spanish the ground pulse from the end of message unit is again extended over conductor 285, make-before-break contact 226, to battery of motor magnet 227, causing it to operate to step wiper 263 of sequence scanner switch 261 to its sixth bank contact. Also at interrupter contacts 228 of motor magnet 227 ground is extended to operate slow release relay 224. When slow release relay 224 restores ground is extended to operate relay 245, this may be traced as follows: ground, make contact 258 of relay 255, break contact 225 of relay 224, wiper 263 and the sixth bank contact of sequence scanner switch 261, conductor 179, to battery of relay 245, causing it to operate. Relay 245 in operating causes motor magnet 227 to step wiper 263 of sequence scanner switch 261 to its homing bank contact, this may be traced as follows: ground, off-normal springs 231, make contact 247 of relay 245, off-normal springs 230, interrupter contact 229, to battery of motor magnet 227, causing it to operate to step wiper 263. At interrupter contact 229 of motor magnet 227 the ground is interrupted each time motor magnet 227 operates. Also, relay 245 in operating at break contact 249 removes the holding ground on slow release relay 148. Relay 148 will remain operated until ground on conductor 276 is extended through the break-make contacts 248 to operate slow-to-operate relay 326, this may be traced as follows: ground, break contact 171 of relay 170, break contact 177 of relay 176, conductor 178, conductor 276, make contact 248 of relay 245, make contact 150 of slow release relay 148, conductor 275, wiper 309 and the first bank contact of scanner-selector switch 305, to battery of slow-to-operate relay 326.

At break contact 329 of slow-to-operate relay 326 the holding ground is removed from relay 334 which holds up the digit registers; at break contact 328 the line loop is opened to prevent the message selector 400 from being seized again while the digit registers are restoring; and at make contact 327 relay 326 locks-up to a holding ground to remain operated while the digit registers are restoring, this may be traced as follows: ground, break contact 325 of relay 324, break contact 331 on relay 330 which restored when holding ground was removed at make contact 336 of relay 334 now restored, break contact 338, off-normal springs 452 of motor magnet 449 (motor magnet 449 also operates on this ground to step wiper 454 to its normal contact), make contact 458 of relay 456 (relay 456 also operates on this ground), break contacts 448, 434 and 419, make contact 327, to battery of relay 326, holding it operated. Relay 326 is, in addition, made a slow-to-release relay so that it holds up during the stepping on the wipers. Thus, each of the motor magnets 449, 435, 420 and 401 and relays 456, 446, 432 and 417 are sequentially operated to step the corresponding wipers of the respective digit registers to their homing bank contacts, and at their respective off-normal springs 452, 438, 423 and 404 extend the ground, upon opening, to the succeeding motor magnet to operate them, and at make contacts 458, 448, 434 and 419 to battery of relay 326 holding it operated. When the last motor magnet 401 steps wipers 408–410 to their normal contacts the ground is removed and after the slow release delay relay 326 restores.

It may also be observed that at make contact 248 of relay 245 when relay 245 operated to transfer the ground on conductor 276 to conductor 275 the ground through make contact 150 of relay 148 was also extended to battery of relay 219, causing it to operate. Relay 219 in operating at break contact 220 removes holding ground from relays 110, 202 and 205 causing them to restore. Thus, any time that ground is extended on conductor 275 relay 219 is caused to operate to remove the holding ground on any of the relays in either of the two chains of relays.

Also, at break contact 248 of relay 245 the holding ground for relays 255 and 251 on conductor 276 was removed to cause them to restore. Relay 255 in restoring at make contact 258 removes ground from the wiper 263 of sequence scanner switch 260, which in turn removes ground from relay 232 to cause it to restore. Relay 251 in restoring removes the holding ground at make contact 252 of the relays 501 and 513 to cause them to restore. With these relays now restored the scanner-selector switch 305 is now ready and available to serve any other message selector which may be requesting service.

*Arrival Announcement*

To announce the arrival of an airline flight the operator at telephone substation 101 sets selector switch 103, removes the handset (not shown), and dials a first digit to indicate the flight is "now arriving" and then the three digits of a flight number as on making a departure announcement. For an arrival announcement, however, the operator dials the digit 2 rather than the digit 3 which indicates a departing flight. On dialling the digit 2 wipers 408–410 of digit register 460 of message selector 400 are stepped in response to the dial impulses to the second bank contact in the manner previously described. The operator then dials the three digits of the flight number and the wipers of digit registers 470, 480 and 490 are stepped accordingly to the corresponding bank contacts of the respective digit registers. On completion of dialling relay 334 operates as previously described and the operator may replace the handset, the dialled digits being stored as before.

When relay 334 operates ground is again removed from a first bank contact of scanner-selector switch 305 associated with message selector 400 at the break contact of break-make contact 337 and at the make contact of the break-make contact 337 extended by way of conductor 282, break contact 250, to battery of relay 301, causing it to operate. Wiper 308 of scanner-selector switch 305 steps in search of the message selector requesting service in the manner previously described, and on finding the first bank contact the "X" contact 257 of relay 255 again operates to extend ground to operate relay 255 fully. On "X" contact 257 closing relay 251 is also operated to close make contact 252 which starts the decoding operation previously described. Simultaneously, when relay 255 operated ground is extended to operate relay 332 which initiates the sequence of operation fully described in the preceeding discussion.

It may be observed that when ground is extended to wiper 408 of digit register 460 the same recording element containing the initial segment of the message used for a "now boarding" announcement, which will be subsequently described, is energized, that is, the solenoid associated with this recording element is energized to start the recording element running. When the need occurs to use a different initial segment it is only necessary to remove the jumper cable from the second to the seventh bank contact of digit register 460 and to add an additional recording element containing the message segment desired.

It may also be recalled that when ground was extended to wiper 410 of digit register 460 on a departure announcement the ground was extended by means of the third bank contact and conductor 416 to the solenoid of the recording element containing a "final departure" announcement, which is then transmitted in addition to the first "departure" announcement. On an arrival announcement, however, it is not essential that a "final announcement be made since there is no danger of a passenger missing his airline flight. The second bank contact, as well as the seventh, of digit register 460 is therefore arranged to extend ground from wiper 410 over conductor 274, make-before-break contact 226 of slow release relay 224, to battery of motor magnet 227 to cause it to operate and step wiper 263 of sequence scanner switch 260 to the next bank contact. Relay 245 then operates to cause motor magnet 227 to operate and step wiper 263 of sequence scanner switch 260 to its homing position, and to restore relays 301, 255 and 251, as well as the digit registers of message selector 400, in the manner previously described.

In addition, if the arrival of any of the airline flights is to be announced in one or more foreign languages the output leads of the decoder corresponding to the particular flight numbers to be announced in a foreign language are connected, as before, through the contacts on relays 110, 120 and 130, and in addition they are connected to relay 200, 205, 210 and 215 by way of diodes 137–140 and conductor 141. The operation of these relays to advance the sequence to announce the messages and any of the foreign languages is exactly as previously described.

*Now Boarding Announcement*

To announce the "now boarding" of an airline flight the operator follows the same steps previously described when making either a departure or arrival announcement only he dials the digit 7 instead of the digit 3 or 2 for the above announcements, respectively. The operation of the system is as it is described above except for the "now boarding" announcement which is included in the message rather than the announcements previously mentioned when ground is extended to the wiper 409 of digit register 460 during the sequence of operation outlined in the preceeding discussions. If it is desired to announce the "now boarding" of any of the airline flight numbers in other than the English language the output leads of the decoder switches 601–604 are connected through relays 110, 120 and 130 in the manner heretofore described.

*General Paging Announcement*

The flight attendant at telephone substation 101, for example, first sets selector switch 103 to disconnect his substation 101 from its associated message selector 400 and to connect it to the telephone line 109 which extends to the central office or PABX installation 151, removes the handset (not shown) to complete a circuit to a ground-forwarding selector (shown simply as a relay 152 having a ground forwarding contact) in the central office or PABX installation 151 in the manner well-known in the telephone art, and then dials "0" whereon the selector steps accordingly to seize the terminals of conductors 180 and to extend ground on the control lead of the selector to conductor 184 to operate relay 241. Relay 241 in operating closes make contact 243 to energize the main amplifiers in the manner previously described. The flight attendant then listens, using the receiver of the telephone handset, to determine whether or not a high frequency tone (a beep tone) is present, and if not present he may transmit his general announcement by means of the transmitter of telephone handset, switch 103, conductors 109, to the central office 151, over conductors 180, break contact 238–239, conductors 183–184, break contacts 172–173, to the main amplifiers (not shown), to the loudspeakers of the system. It may be recalled that the high frequency tone was previously applied to conductors 180 when relay 232 operated under normal operating conditions. This tone therefore serves to warn the flight attendant desiring to make a general announcement that the system is presently being used. He may then either hang up the handset and try again, or he may wait until the tone ceases and then make the announcement in the manner described above.

It may also be noted that relay 241 in operating extends ground through make contact 242, break contact 259, to battery of relay 253 to cause it to operate. Relay 253 in operating removes ground from conductor 281 at break contact 254 to prevent any of the message selectors from being seized by the scanner selector switch 305.

*Emergency Announcement*

On an emergency announcement immediate access to the system is provided and any announcement in the process of being made is discontinued, held by the message selector and then commenced from the start of the message after the emergency announcement is completed. To gain immediate access the operator holds push button 162 depressd to extend ground to operate relay 170 which, in operating, extends the microphone 161 through make contact 172–173 to the main amplifiers; removes a holding ground on relays 255 and 251 at break contact 171 causing them to restore; at make contact 171 extends a ground to operate relays 176 and 245; at make contact 174 closes ground to hold relay 241 operated in order to keep the main amplifiers energized; and at make contact 175 closes a patch to operate relay 221, if motor magnet 227 is operated closing off-normal springs 231. When relay 245 operates the relays of the scanner-controller automatically restore in the manner previously described, however, no ground pulse is extended to operate relay 326 of message selector 400 to cause it to release the stored information; thus the information is held during the emergency announcement. This is true since the ground normally extended to operate relay 326 when relay 245 operates is removed at break-make contacts 171 when relay 170 operated. Relay 221 in operating at break contact 223 opens a path whereby ground is normally extended to operate either relay 205, 210 or 215 when off-normal springs 231 restore to normal when motor magnet 227 steps wiper 263 of sequence scanner switch 260 to its homing contact. In addition relay 221 locks up through its own make contact 222 to the ground on off-normal springs 231 when off-normal springs 231 restore. Relay 221 therefore prevents any of the relays 205, 210 or 215 from operating to operate one of the relays 110, 120 or 130 to switch the output leads to the recording elements from one language to another.

The operator transmits his emergency announcement by means of microphone 161, the output of which is extended through make contacts 172–173, over conductors 181 to the main amplifiers and loudspeakers of the system. On the completion of the emergency announcement the operator releases push button 162 causing ground to removed from relay 170 which then restores. Relay 170 in restoring removes ground at make contact 171 from relay 176, causing it to restore. Relay 176 is a slow-to-release relay and is provided to allow relay 245 to restore before it restores. If relay 245 did not restore prior to relay 176 restoring it may be observed that ground would be extended through break contact 171 of relay 170, break contact 177 of relay 176, over conductors 178 and 276, make contact 248 of relay 245 (if relay 245 is not yet restored), either break contact 204 of relay 200 or make contact 150 of relay 148, over conductor 275, to wiper 309 and the first bank contact of scanner selector switch 305, to battery of relay 326 to cause it to operate and release the stored information. It may be observed that when relay 170 restores, or when off-normal springs 231 of motor magnet 227 are restored to normal that the ground operating relay 221 is removed at either make contact 175 of relay 170 or at the off-normal springs 231 of motor magnet 227. However, relay 221 is locked up over its own make contact 222 to ground on off-normal springs 231 when off-normal springs 231 are restored to normal. It is essential that relay 221 remain operated after push button 162 is restored to normal at the end of the emergency announcement until motor magnet 227 is again caused to step wiper 263 of sequence scanner switch 261 to its first bank contact to thereby open off-normal springs 231 to remove ground at that point. If relay 221 did not remain operated to open break contact 223 the ground on off-normal springs 231 would be extended to operate one of the relays in the relay chain comprising relays 205, 210 and 215.

Once relay 245 and relay 176 both restore relays 301, 255 and 251 are again operated in the manner previously described in the sequence of operation is again commenced to transmit the prior announcement which had been interrupted.

*Power Failure*

During a power loss in the switching arrangement the operator sets selector switch 103 to connect telephone substation 101 to telephone line 109, removes the handset, and dials "0" as he does when making a general paging announcement. As previously described, the terminals of conductors 180 are seized and ground is extended from the control lead of the ground-forwarding selector to conductor 184 to operate relay 241 energizing the main amplifiers which have a power supply independent of the switching arrangement. The power loss to the switching arrangement therefore has no effect on the main amplifiers and it is only necessary for the operator to proceed as when making a general announcement.

What is claimed is:

1. An announcing system wherein a complete message is formed from individual phrases that are separately prerecorded in a plurality of recording elements, and wherein said complete message is repeated in each of a plurality of different languages, said system comprising: a plurality of stations; means at each of said stations operative to transmit signals representative of code digits; message selector means connected to said stations and comprising a plurality of digit registers, each for registering one of said code digits; information group selector means having a plurality of input terminals and a plurality of groups of output terminals, said input terminals being selectively connected to said output terminals in each of said groups of output terminals; a plurality of information groups each comprising a plurality of said recording elements, said recording elements in each of said groups having input terminals connected to individual ones of said last-mentioned groups of output terminals; said information group selector means being operative to sequentially connect said input terminals to said output terminals in each of said groups for selecting one of said information groups; and decoder means connected to said message selector means and comprising a plurality of decoder switches having wipers and bank contacts, said bank contacts having individual circuit connections to said input terminals of said information group selector means, and having means for stepping said wipers for engaging said bank contacts, said last-mentioned means automatically operated in accordance with said setting of said plurality of digit registers for selecting the recording element in each of said information groups as said information group selector means sequentially connects said input terminals to each of said information groups corresponding to said registered code digits.

2. An announcing system as claimed in claim 1, wherein there is further included information group sequence advance means connected to said information group selector means operated upon the completion of an announcement in each of said languages for controlling the operation of said information group selector means to sequentially connect said input terminals to each of said information groups.

3. An announcing system as claimed in claim 2, wherein there is further included information group cancellation means having an input terminal from said information group selector means and an output terminal connected to said information group sequence advance means for cancelling said message announcements whereby said sequence of announcements in said different languages may be cancelled at any point in said sequence when a complete message in a preceeding language is completed.

4. An announcing system as claimed in claim 3, wherein said decoder means further includes decoder switch access means operated in accordance with the setting of said digit registers and said message selector means for selecting one of said decoder switches.

5. An announcing system as claimed in claim 4, including circuit connections extending from said digit registers to the wipers on corresponding levels of said decoder switches for activating a selected recording element which is connected to the last mentioned level of one of said decoder switches.

6. An announcing system as claimed in claim 5, said system further comprising a decoder stopping arrangement including test relay means having a first and a second winding, and circuit connections including said first and said second windings, said wipers and bank contacts on at least two of said levels of said decoder switches, and said wipers and bank contacts on at least one of said levels of one or more of said digit registers in series whereby said test relay means is operated over said series circuit connections only in response to the coincident setting of the wipers of all of said above mentioned switches so as to stop the stepping of said decoder switches and thereby select one of said recording elements.

7. An announcing system wherein a complete message is formed from individual phrases that are separately prerecorded in a plurality of recording elements and wherein said complete message is repeated in each of a plurality of different languages, said system comprising: a plurality of stations; means at each of said stations operative to transmit signals representative of code digits; message selector means operated in response to the receipt of said transmitted code digits for registering said code digits; a plurality of information groups, each comprising a plurality of said recording elements; information group selector means connected between said message selector means and said plurality of information groups operative to sequentially select each of said information groups; control means, including message selector holding means, connected to said message selector means operative to sequentially activate the different ones of said plurality of recording elements in each of said selected information groups for reproducing the complete message in response to the setting of said message selector means as determined by the code digits therein; and information group sequence advance means connected to said control means and said information group selector means operated in response to the operation of said message selector holding means for causing said information group selector means to sequentially select each of said information groups and for causing said control means to sequentially activate the different ones of said plurality of recording elements in said selected information groups whereby a complete message is repeated in a plurality of different languages.

8. An announcing system as claimed in claim 7, wherein there are provided identifying means having a plurality of recording elements connected directly thereto through the medium of said information group selector means, said identifying means being operated under control of said control means during said sequence of operation to automatically include said recording elements corresponding to the message selector requesting service.

9. An announcing system as claimed in claim 8, wherein one or more of said recording elements are connected through the medium of said information group selector means to said digit registers and are directly selected by said digit registers in accordance with a code digit registered therein, one or more others of said recording elements connected to said information group selector means being selected through the medium of said decoder means in accordance with the code digits registered in said digit registers.

10. An announcing system wherein a complete message is formed from individual phrases that are separately pre-recorded in a plurality of recording elements and wherein said complete message is repeated in each of a plurality of different languages, said system comprising: a plurality of stations; pulsing means at each of said stations operative to transmit code digits in the form of digital impulses; message selector means individual to each of said stations, said message selector means operated in response to the receipt of said digital impulses for registering the code digits thereof; a plurality of information groups, each comprising a plurality of said recording elements; information group selector means connected to said plurality of information groups operative to sequentially select each of said information groups; decoder means connected between said information group selector means and said message selector means operated in response to the code digits registered therein for selecting one or more of said recording elements in said selected information groups in accordance with said registered code digits; control means, including message selector holding means, connected to said message selector means operative to sequentially activate the different ones of said plurality of recording elements in each of said selected information groups for reproducing the complete message in response to the setting of said message selector means as determined by the code digits therein; and information group sequence advance means connected to said information group selector means having an input connection from said decoder means and said control means and being under control of both said last mentioned means for causing said information group selector means to sequentially select each of said information groups and for causing said control means to sequentially activate the different ones of said recording elements in said selected information groups.

11. An announcing system wherein a complete message is formed from individual phrases that are separately pre-recorded in a plurality of recording elements and wherein said complete message is repeated in each of a plurality of different languages, said system comprising: a plurality of stations; pulsing means at each of said stations operative to transmit code digits in the form of digital impulses; message selector means individual to each of said stations, said message selector means operated in response to the receipt of said digital impulses for registering the code digits thereof; decoder means common to all of said message selector means connected between said information groups selector means and said message selector means operated in response to the code digits registered therein for selecting one or more of said recording elements in said selected information groups in accordance with said registered code digits; control means, including message selector holding means, connected to said message selector means operative to sequentially activate the different ones of said plurality of recording elements in each of said selected information groups for reproducing the complete message in response to the setting of said message selector means as determined by the code digits therein; and information group sequence advance means connected to said information group selector means having an input connection from said decoder means and said control means and being under control of both said last mentioned means for causing said information group selector means to sequentially select each of said information groups and for causing said control means to sequentially activate different ones of said recording elements in said selected information groups.

12. An announcing system as claimed in claim 11, wherein there is further included information group cancellation means connected to said information group selector means and said control means for cancelling said message announcements whereby said sequence of announcements may be cancelled at any point in said sequence when a complete message in a preceding language is completed.

13. An announcing system as claimed in claim 12, said system further comprising emergency announcing apparatus having transmitter means, actuating means, relay means connected to said actuating means and operated in response to the operation of said actuating means for connecting said transmitter means to the amplifiers in said system and for terminating any message in the process of being announced, means in said control means connected to said relay means operated in response to the operation of said relay means for activating the amplifiers of said announcing system if said amplifiers have not been activated and for holding said amplifiers activated if said amplifiers are activated, and further means connected to said relay means operated in response to the operation of said relay means for rendering said information group sequence advance means inoperative to cause said information group selector means to advance to select another of said information groups, and still further means connected to said relay means operated in response to the operation of said relay means for causing said control means to lock on said message selector, if an announcement is in progress, and thereby store said announcement until after said actuating means is restored whereby an emergency announcement is given priority over any other announcement in progress and said interrupted announcement is stored and repeated after completion of said emergency announcement.

14. An announcing system as claimed in claim 13, said system further comprising a telephone office having telephone switching means and telephone lines connected thereto, and comprising general paging apparatus including switch means operative to connect said pulsing means to one of said telephone lines, said telephone switching means operated in response to said pulsing means transmitting a predetermined code digit for establishing a connection with a second telephone line extending from said telephone office to said announcing system; and comprising relay means in said control means connected to said second telephone line operated in response to said telephone switching means seizing said second telephone line for activating the amplifiers of said announcing system; and comprising conductor means in said control means connected to said second telephone line for extending said second telephone line for extending said second telephone line to said amplifiers whereby said announcing system is operable independent of said recording elements to thereby allow general paging announcements to be made in addition to the messages derived from said recording elements.

15. An announcing system as claimed in claim 14, wherein said message selector means comprises a plurality of digit register means operated in response to said pulsing means for registering, individually, one of said code digits; and wherein said decoder means is connected to predetermined ones of said digit register means and operated in response to the registered code digits in said predetermined ones of said digit registers for selecting one or more of said recording elements in a selected one of said information groups in accordance with said registered code digits.

16. An announcing system as claimed in claim 15, wherein said message selector means includes holding means operated in response to the operation of all of said digit register means for holding said digit register means operated independently of said pulsing means.

17. An announcing system as claimed in claim 16, wherein said control means includes sequence control means operative to sequentially activate under the control of signals received from said recording elements in the selected ones of said information groups the different ones of said plurality of recording elements in said groups in a predetermined order, for reproducing the complete message responsive to the setting of the selected message selector means as determined by the registered code digits thereon.

18. An announcing system as claimed in claim 17, wherein said control means includes allotter means, said allotter means marked by said holding means to indicate the condition of said message selector means and operated in response to said message selector means for automatically selecting individual ones of said message selector means in accordance with said markings.

19. An announcing system wherein a complete message is formed from individual phases that are separately prerecorded in a plurality of recording elements and wherein said complete message is repeated in each of a plurality of different languages, said system comprising: a plurality of stations; pulsing means at each of said stations operative to transmit code digits in the form of digital impulses; message selector means individual to each of said stations operated in response to the receipt of said digital impulses for registering the code digits thereof; a plurality of information groups, each comprising a plurality of said recording elements; information group selector means connected between said message selector means and said plurality of information groups operative to sequentially select each of said information groups; decoder means connected to all of said message selector means and to said information group selector means, said decoder means comprising a plurality of decoder switches operated in response to the registered code digits in said message selector means for automatically selecting one or more of said recording elements in said selected ones of said information groups in accordance with said registered code digits; and control means, including message selector holding means, connected to said message selector means operative to sequentially activate a different one of said plurality of recording elements in each of said selected information groups for reproducing the complete message in response to the setting of said message selector means as determined by the code digits therein; and information group sequence advance means connected to said control means and said information group selector means operated in response to the operation of said message selector holding means for causing said information group selector means to sequentially select each of said information groups and for causing said control means to sequentially activate the different ones of said plurality of recording elements in said selected information groups.

20. An announcing system as claimed in claimed 19, wherein said decoder means includes decoder switch access means operated in response to the registered code digits in said message selector means for selecting a predetermined one of said plurality of decoder switches.

21. An announcing system as claimed in claim 20, wherein said message selector means comprises a plurality of digit registers each having a plurality of levels of bank contacts, said bank contacts of at least one of said levels of predetermined ones of said digit registers being multipled to form two groups of bank contacts, each group having a predetermined number of bank contacts therein, movably mounted wipers on each of said levels for engaging said bank contacts, and means for stepping said wipers in response to said digital impulses for selectively engaging one of said bank contacts; and wherein said decoder switch access means are connected individually to predetermined ones of said groups of bank contacts and operated in response to the registration of a code digit in one of said groups for selecting the corresponding one of said decoder switches.

22. An announcing system as claimed in claim 21, wherein each of said decoder switches has a plurality of levels of bank contacts, moveably mounted wipers on each of said levels for engaging said bank contacts, and means for stepping said wipers for engaging said bank contacts, the stepping means of said selected decoder switching being operated in response to the operation of said predetermined decoder switch access means for causing the stepping means of said switch to automatically step said wipers.

23. An announcing system as claimed in claim 22, said system further comprising a decoder stopping arrangement including test relay means having a first and a second winding, and circuit connections including said first and said second winding, said wipers and bank contacts on at least two of said levels of said decoder switches, and said wipers and bank contacts on at least one of said levels of one or more of said digit registers in series whereby said test relay means is operated over said series circuit connections only in response to the coincident setting of the wipers of all of said above-mentioned switches so as to stop the stepping of said decoder switches and thereby select one or more of said recording elements.

24. An announcing system as claimed in claim 23, wherein said control means comprises an allotter switch having a plurality of levels of bank contacts, corresponding ones of said contacts on each of said levels being associated without of said message selector means, moveably mounted wipers on each of said levels for engaging said bank contacts, and means for stepping said wipers for selectively engaging said bank contacts, said last-mentioned means operated in response to the operation of said message selector means to automatically step said wipers for allotting one of said message selector means requesting service; and wherein said wipers and bank contacts on at least two of said levels of bank contacts on said allotter switch is included in said series circuit connections.

25. An announcing system as claimed in claim 24, wherein said decoder means includes circuit connections extending from individual ones of said bank contacts on one of said levels of one of said digit registers to the wipers on corresponding levels of said selected decoder switch for activating the particular one only of said selected recording elements in each of said selected ones of said information groups which is connected to the last-mentioned level.

References Cited in the file of this patent

UNITED STATES PATENTS

| | | |
|---|---|---|
| 2,777,901 | Dostert | Jan. 15, 1957 |
| 2,832,841 | Eldridge | Apr. 29, 1958 |